United States Patent Office 3,565,860
Patented Feb. 23, 1971

3,565,860
OXIME-CONTAINING ORGANOTIN COMPOUNDS
Kailash Chandra Pande, Parkersburg, W. Va., assignor, by mesne assignments, to Stauffer-Wacker Silicone Corporation, a corporation of Delaware
No Drawing. Continuation-in-part of application Ser. No. 516,756, Dec. 27, 1965. This application Dec. 4, 1968, Ser. No. 781,274
Int. Cl. C08g 31/14, 47/06
U.S. Cl. 260—46.5        5 Claims

ABSTRACT OF THE DISCLOSURE

Concerns oxime-containing organotin compounds applicable to the curing of silicone rubbers and to the preparation of flexible polyurethane foams. The compounds, in general, may be prepared by reacting selected acetoximes or aldoximes with oxides or alkoxides of selected organotin intermediates. According to a second method, the acetoxime or aldoxime may be first reacted with an alkali metal hydroxide and the resulting salt reacted with a halide of the organotin intermediate.

---

The present application is a continuation-in-part of application Ser. No. 516,756, filed Dec. 27, 1965. The earlier application is hereby abandoned.

This invention relates to a class of organotin compounds useful as catalysts in the curing of silicone rubbers and in the production of flexible polyurethane foams.

These compounds conform to the type formula:

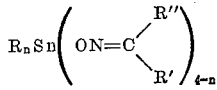

where R and R'' are selected from the class consisting of halo, aliphatic groups of from 1 to 12 carbon atoms, alicyclic groups, aromatic groups, and such groups when halo- or cyano-substituted; R' is hydrogen or a group other than halo selected from said class; and $n$ is a number of from 1 to 3. Preferably R represents halo and alkyl radicals, R' represents hydrogen, phenyl and alkyl radicals and R'' represents phenyl and alkyl radicals in which the alkyl radicals have up to 4 carbon atoms The compounds of the invention at present find particular utility as catalysts in the curing of silicone rubbers and in the production of flexible polyurethane foams.

It has been determined that in general such compounds may be readily prepared by reacting the corresponding acetoxime or aldoxime with an oxide or alkoxide of the corresponding organotin compound. Alternatively, the acetoxime or aldoxime may be first reacted with an alkali metal hydroxide to form a salt which may then be reacted with a halide of the corresponding organotin compound to obtain the desired product. To illustrate these three techniques:

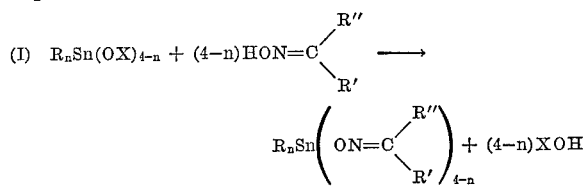

X=low molecular weight hydrocarbon group

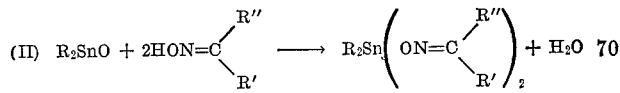

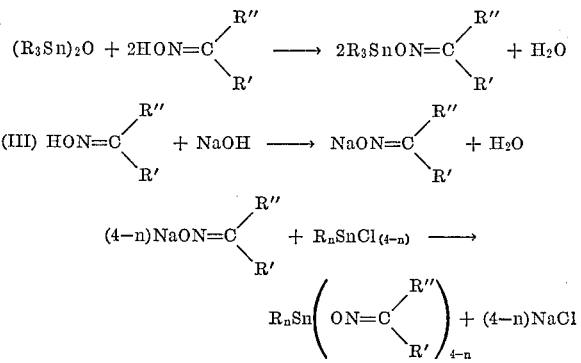

Each of the foregoing reactions is best carried out in the presence of a solvent such as benzene, toluene or cyclohexane, for example. This provides for homogenity of the reaction mixture and enables easy control of the reaction temperatures. Also, where water or an alcohol is a reaction product such solvents allow for its continuous removal as an azeotrope, preventing reversal of the reaction.

Apart from their use as catalysts, certain of the compounds herein have been found useful as intermediates. Thus, the diacetoximo- or dialkoximo-compounds can be employed with advantage in the preparation of mixed salts via the route below indicated:

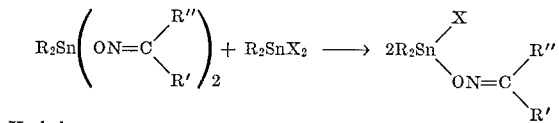

X=halogen

The invention is further illustrated by the following examples which are not to be taken as in any way limitative thereof:

EXAMPLE I

In a 2-liter three-necked flask, fitted with a stirrer, an addition funnel and a reflux condenser were placed 100 grams of hydroxylamine hydrochloride, 240 ml. of water and 160 ml. of acetone. To this was added, dropwise, 200 ml. of 25 percent NaOH solution, whereafter the mixture was refluxed for 10 minutes.

After cooling, the acetoxime crystals were removed by filtration. Subsequently, more acetoxime was extracted from the filtrate with ether which was separated by evaporation.

In a second three-necked flask fitted with a stirrer, a Dean-Stark take-off condenser and an addition funnel were placed 7.3 grams of the acetoxime and 250 ml. of benzene. To this mixture was added a very concentrated aqueous solution of sodium hydroxide (4.0 grams). The mixture was then refluxed and the water removed continuously. After all the water was distilled off, the sodium salt of acetoxime separated out as a white crystalline mass.

The reaction mixture containing the acetoxime salt was brought to room temperature following which 9.4 grams of butyltin trichloride was introduced into the flask. The reaction mixture, containing the tin compound and salt in 1:3 ratio, warmed on this addition which was followed by refluxing and stirring for about 10 hours. On settling of the solid portion subsequent to the refluxing and stirring, the supernatant liquid was decanted off. A crystalline white solid was obtained by evaporating the solvent. N.M.R. and I.R. spectra corresponded with

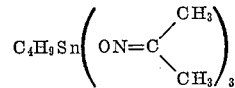

EXAMPLE II

A base composition designed for caulking was prepared by intermixing 10 parts by weight of hydroxy end-blocked organo-polysiloxane fluid, 1 part by weight of ethyl silicate and 5.6 parts by weight of silica filler. To this paste-like mixture was added about 0.15 gram of the diacetoximo-product of Example I. This cured the mixture to a tack-free rubber-like condition in about 30 minutes.

The product of Example I was also tried in a polyurethane foam composition of the following make-up:

| | Parts |
|---|---|
| Polyol | 150.0 |
| Surfactant (silicone-containing polyalkylene oxide) | 2.5 |
| Triethylamine | .25 |
| Water | 6.0 |
| Toluene di-isocyanate | 65.0 |

On processing in the conventional manner, using 1.0 part of the diacetoximo-compound, the properties of the finished foam were equivalent to those obtained through the use of conventional catalysts.

EXAMPLE III

The sodium salt of acetoxime was prepared as described in Example I. To 20 grams of the salt was added 30.4 grams of freshly distilled dibutyltin dichloride (molar ratio 2:1). The reaction mixture was then refluxed with benzene for 6 to 8 hours and worked up as usual. The diacetoximo-dibutyltin was obtained in 30 percent yield as a slightly yellowish liquid: B.P. 96°/0.05 mm.

EXAMPLE IV

To a toluene (250 ml.) solution of dibutyltin dibutoxide (37.9 grams) was added 16.1 grams acetoximo. The reaction mixture was allowed to reflux and the toluene-n-butanol azeotrope boiling at 105.6° C. was continuously fractionated off. This operation took nearly 4 hours. Excess solvent was evaporated under reduced pressure. The remaining slightly yellowish liquid was distilled to obtain diacetoximo-dibutyltin in 92 percent yield (B.P. 100° C. at .08 mm.).

EXAMPLE V

A mixture of 24.9 grams dibutyltin oxide and 16 grams acetoxime (molar ratio 1:2) in 500 ml. benzene was refluxed under stirring with continuous removal of water-benzene azeotrope. After the reaction was complete, excess solvent was removed under reduced pressure. The remaining liquid was distilled to obtain diacetoximo-dibutyltin in 30 percent yield (B.P. 100° C. at .07 mm.).

EXAMPLE VI

Eight grams of acetoxime was converted to the sodium salt in the usual manner. To a suspension of the salt in benzene was added 32.6 grams Bu$_3$SnCl whereafter the mixture was refluxed from 4 to 6 hours. It was then worked up as described in Example I. Twenty-five grams of (C$_4$H$_9$)$_3$SnON=C(CH$_3$)$_2$ was collected as a colorless liquid (B.P. 79° C. at .01 mm.).

EXAMPLE VII

A mixture of 60 grams of tributyltin oxide and 15 grams of acetoxime was refluxed in 250 ml. of toluene. The water formed in the reaction was removed by fractionation. After removing the excess solvent, the remaining liquid was distilled to give the compound of Example VI.

EXAMPLE VIII

A mixture of 12.4 grams of dibutyltin oxide and 12.1 grams of benzaldoxime was refluxed in 200 ml. of benzene. The water formed in the reaction was removed by fractionation. After removing the excess solvent, a slightly yellow viscous liquid was obtained. N.M.R. and I.R. showed it to be

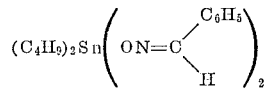

This compound decomposes at elevated temperatures.

EXAMPLE IX

Dibutyltin dichloride (7.5 grams) was dissolved in 10 grams of the product of Example I. The reaction mixture when distilled gave a mixed salt of acetoxime-dibutyltin chloride:

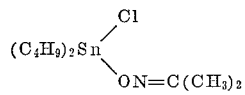

This material, obtained in 55 percent yield, had a B.P. of 85° C. at 0.02 mm.

The invention claimed is:

1. Method for preparing a silicone rubber which comprises reacting a hydroxyl-terminated organopolysiloxane fluid with ethyl silicate in the presence of a catalytic amount of a compound conforming to the formula:

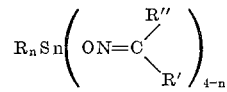

where R is selected from the class consisting of halo and alkyl groups having up to 4 carbon atoms; R' is selected from the class consisting of hydrogen, phenyl and alkyl groups having up to 4 carbon atoms; R" is selected from the class consisting of phenyl and alkyl groups having up to 4 carbon atoms and $n$ is a number of from 1 to 3.

2. A method according to claim 1 where R is butyl and R' is methyl.

3. A method according to claim 2 where $n$ is 1.

4. A method according to claim 2 where $n$ is 2.

5. A method according to claim 2 where $n$ is 3.

References Cited

UNITED STATES PATENTS

| | | | |
|---|---|---|---|
| 2,988,534 | 6/1961 | Eckelmann et al. | 260—45.75 |
| 2,727,917 | 12/1955 | Mack et al. | 260—429 |
| 2,999,077 | 9/1961 | Nitzsche et al. | 260—18 |
| 3,055,845 | 9/1962 | Merten et al. | 260—2.5 |
| 3,275,659 | 9/1966 | Wegssenberger | 260—347.7 |
| 3,392,153 | 7/1968 | Hostettler et al. | 260—77.5 |
| 2,843,555 | 7/1958 | Berridge | 260—18 |
| 2,927,907 | 3/1960 | Polmanteer | 260—37 |
| 3,245,958 | 4/1966 | Hindersinn et al. | 260—75 |
| 3,397,158 | 8/1968 | Britain et al. | 260—2.5 |

FOREIGN PATENTS

| | | | |
|---|---|---|---|
| 248,966 | 1/1964 | Australia | 260—2.5 |
| 901,056 | 7/1962 | Great Britain | 260—77.5 |

DONALD E. CZAJA, Primary Examiner

C. W. IVY, Assistant Examiner

U.S. Cl. X.R.

260—2.5, 429.7